Figure 6:
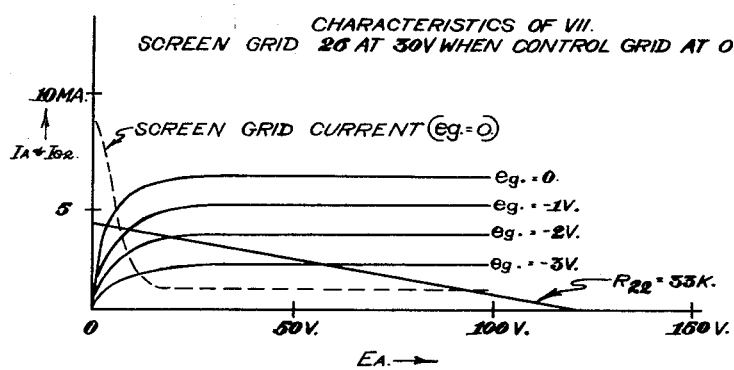

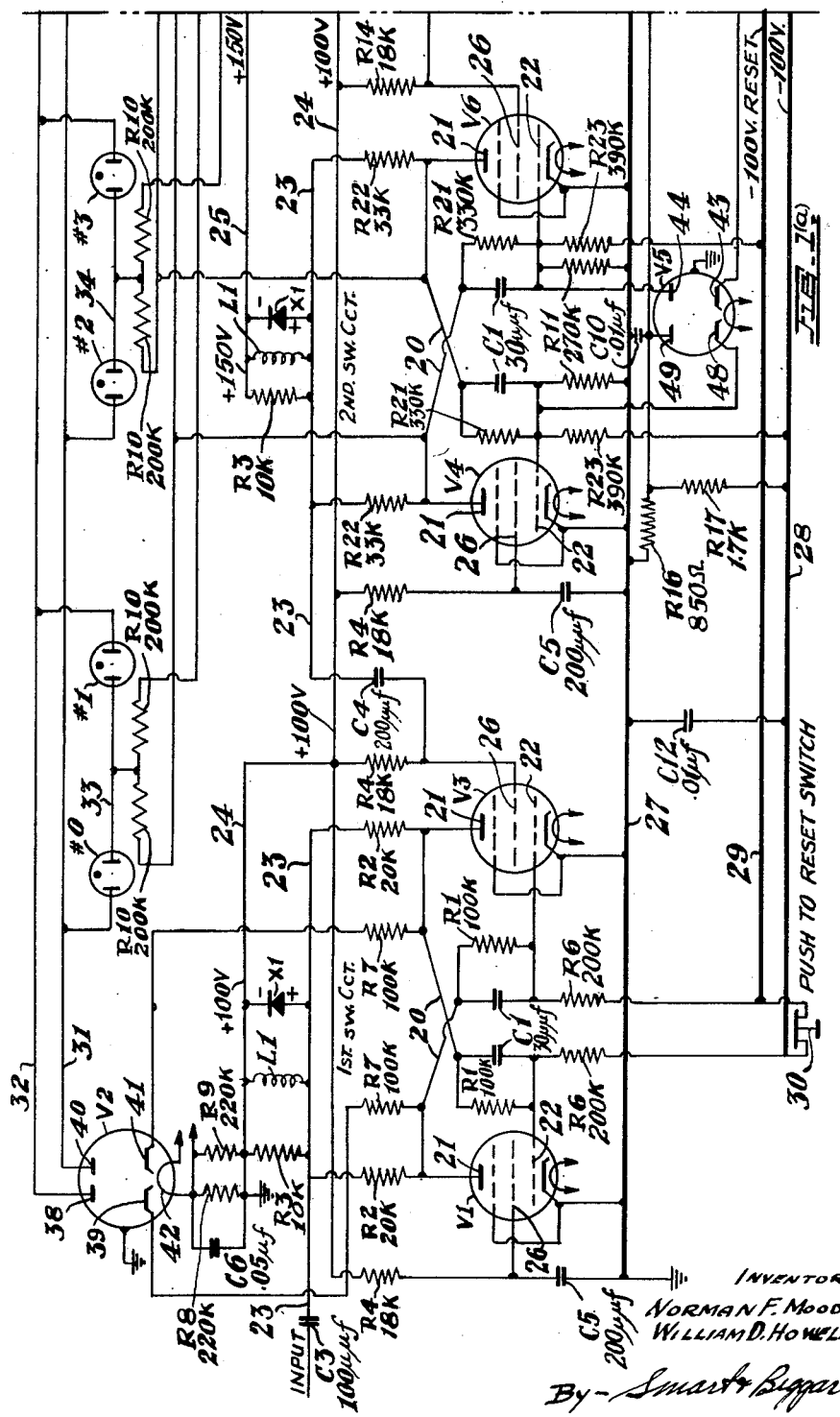

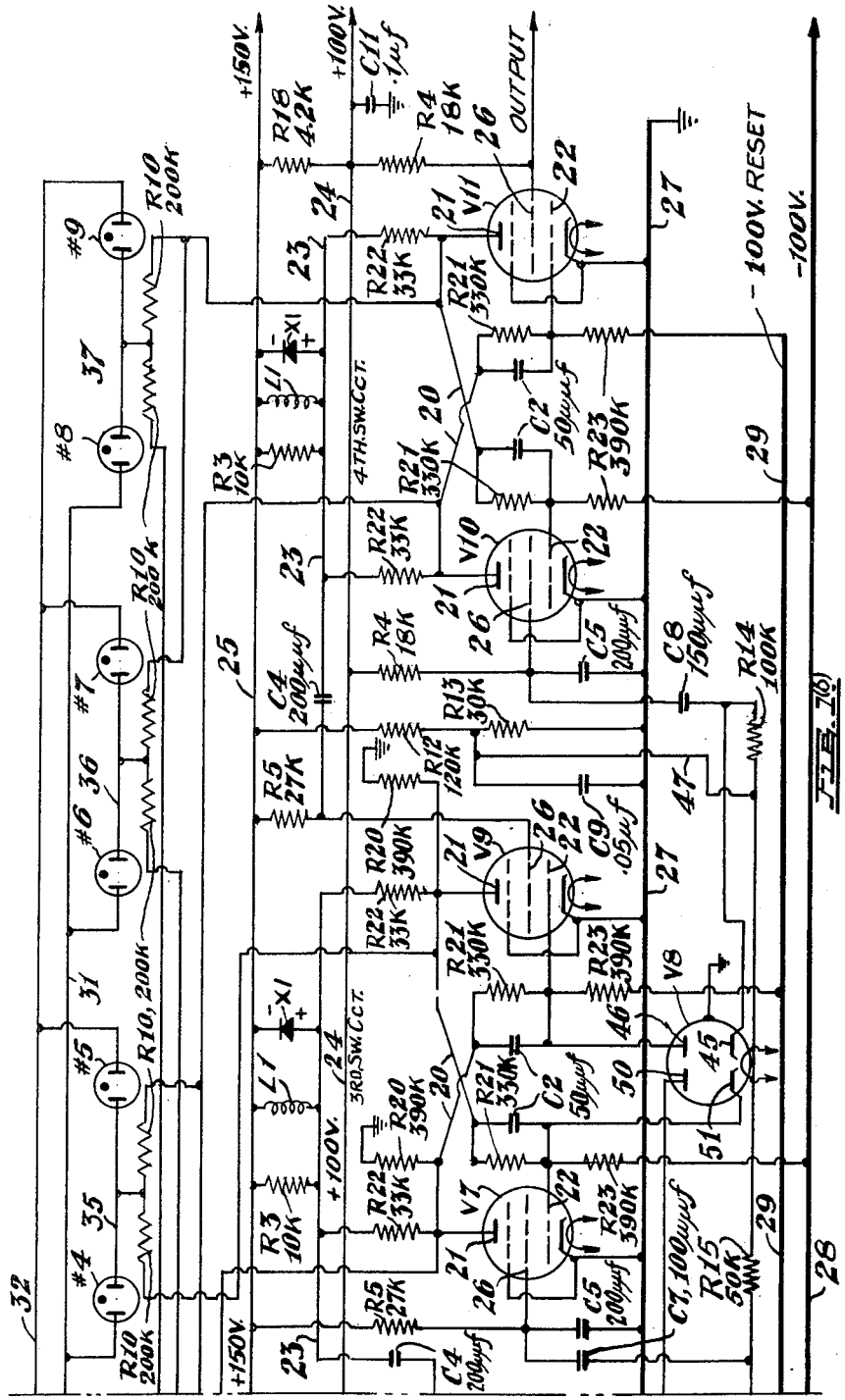

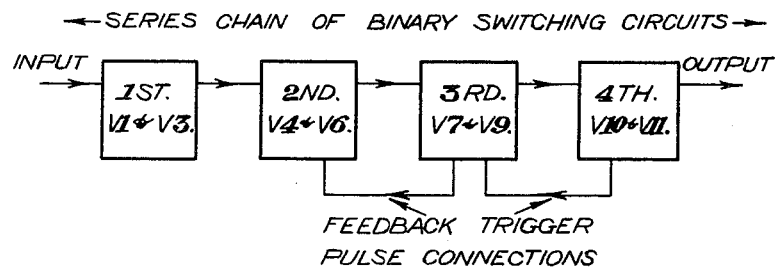
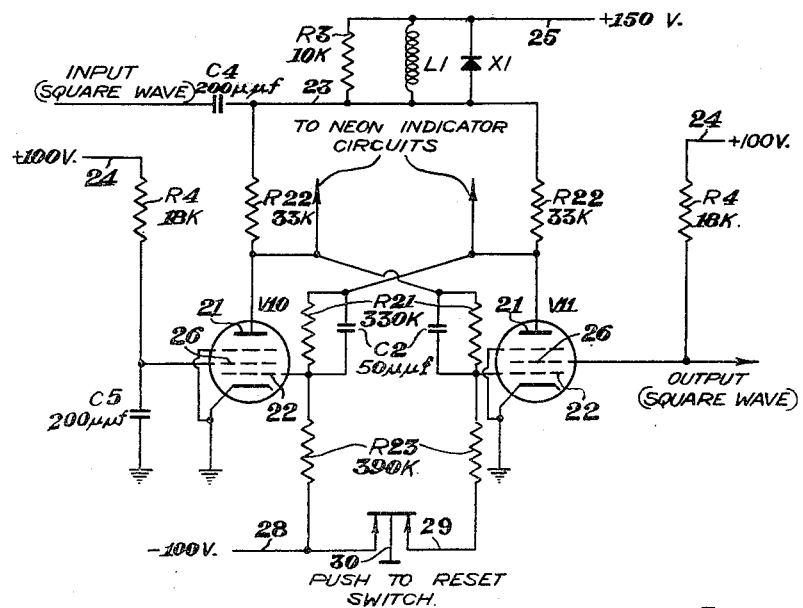

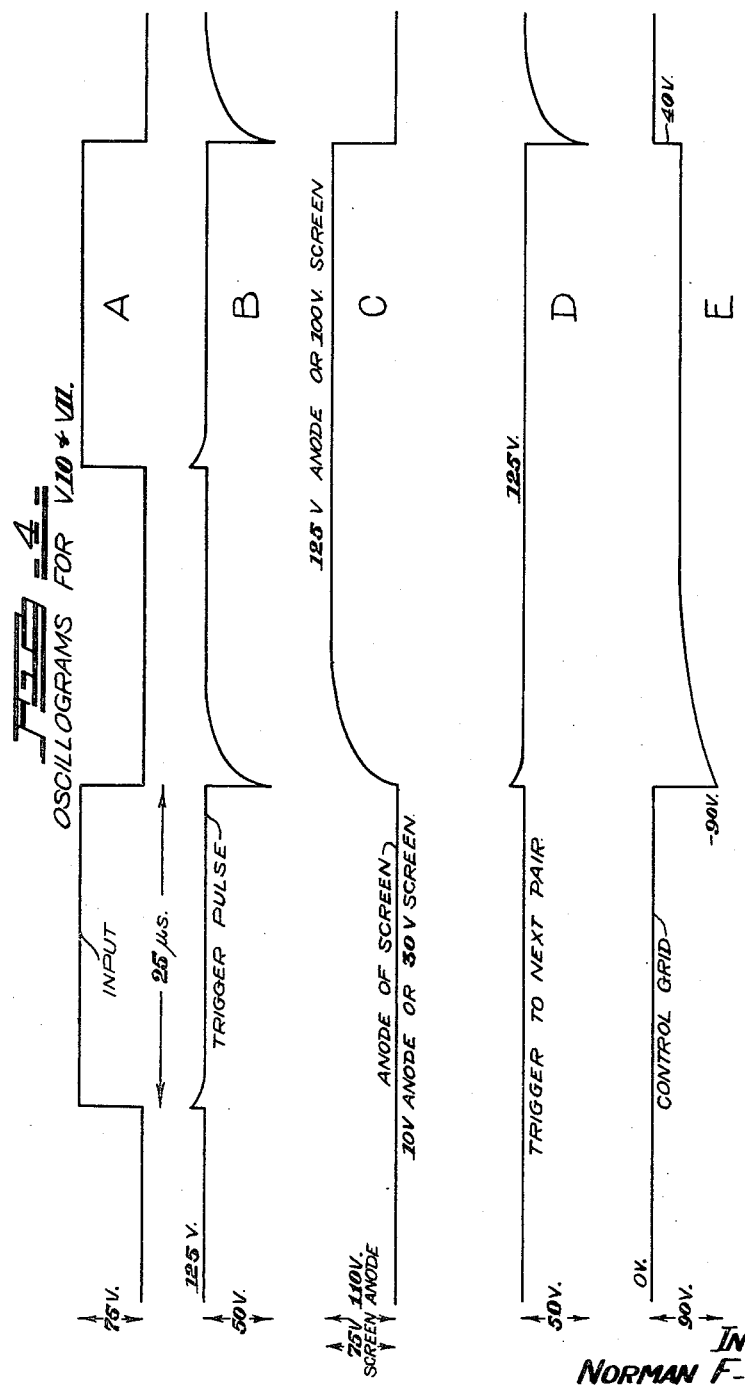

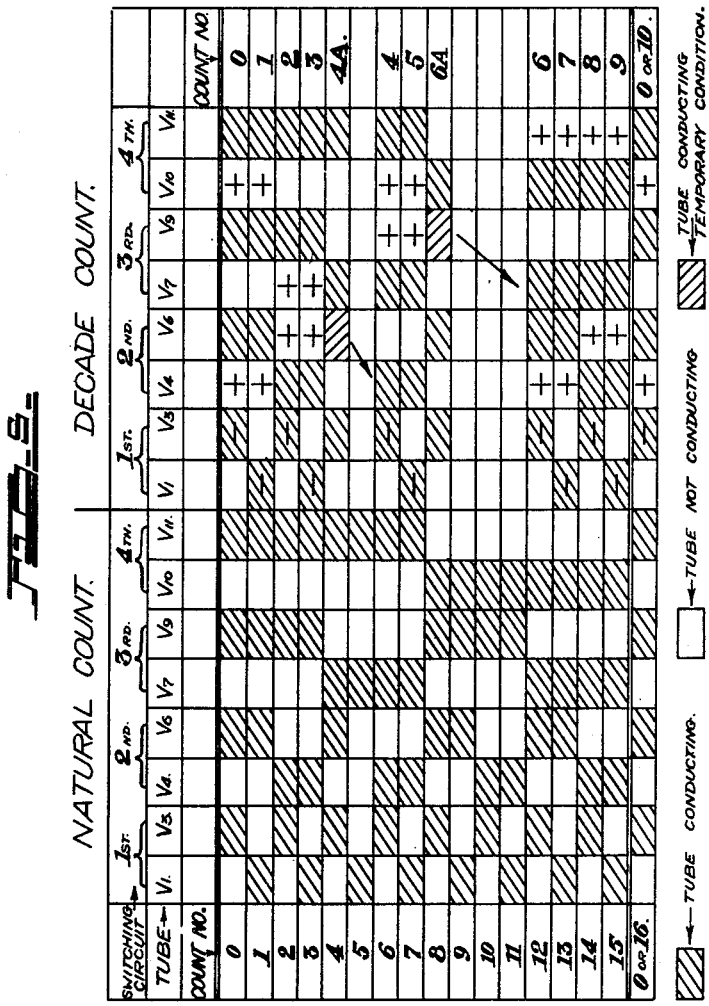

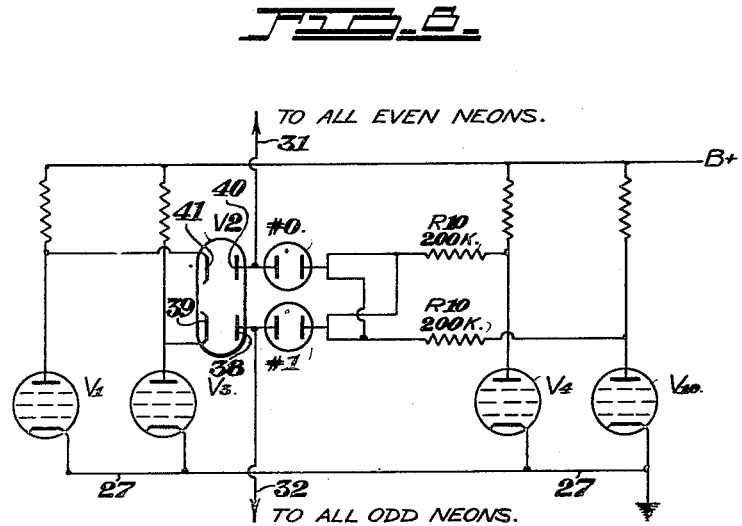

FIG. 8.

FIG. 9.

| COUNT NO. | V3 | V4 | V10 | CONDITION OF NEON #0. | DIRECT VOLTAGE APPLIED TO NEON #0. |
|---|---|---|---|---|---|
| 0 | ▨ | + | + | LIT | 105 V. |
| 1 |  | + | + | EXTINGUISHED | CIRCUIT BROKEN* |
| 2 | ▨ |  | + | EXTINGUISHED | 37 V. |
| 3 |  |  | + | EXTINGUISHED | CIRCUIT BROKEN* |
| 4 | ▨ |  | + | EXTINGUISHED | 37 V. |
| 5 |  |  | + | EXTINGUISHED | CIRCUIT BROKEN* |
| 6 | ▨ | + |  | EXTINGUISHED | 37 V |
| 7 |  | + |  | EXTINGUISHED | CIRCUIT BROKEN* |
| 8 | ▨ |  |  | EXTINGUISHED | 0 |
| 9 |  |  |  | EXTINGUISHED | CIRCUIT BROKEN* |
| 0 + 10. | ▨ | + | + | LIT. | 105 V. |

▨ TUBE CONDUCTING.   * BY DIODE V2.   + 115 V. ANODE TO GROUND.
− EVEN NEONS SELECTED.

INVENTORS –
NORMAN F. MOODY–
WILLIAM D. HOWELL–
BY Smart & Biggart
ATTORNEYS–

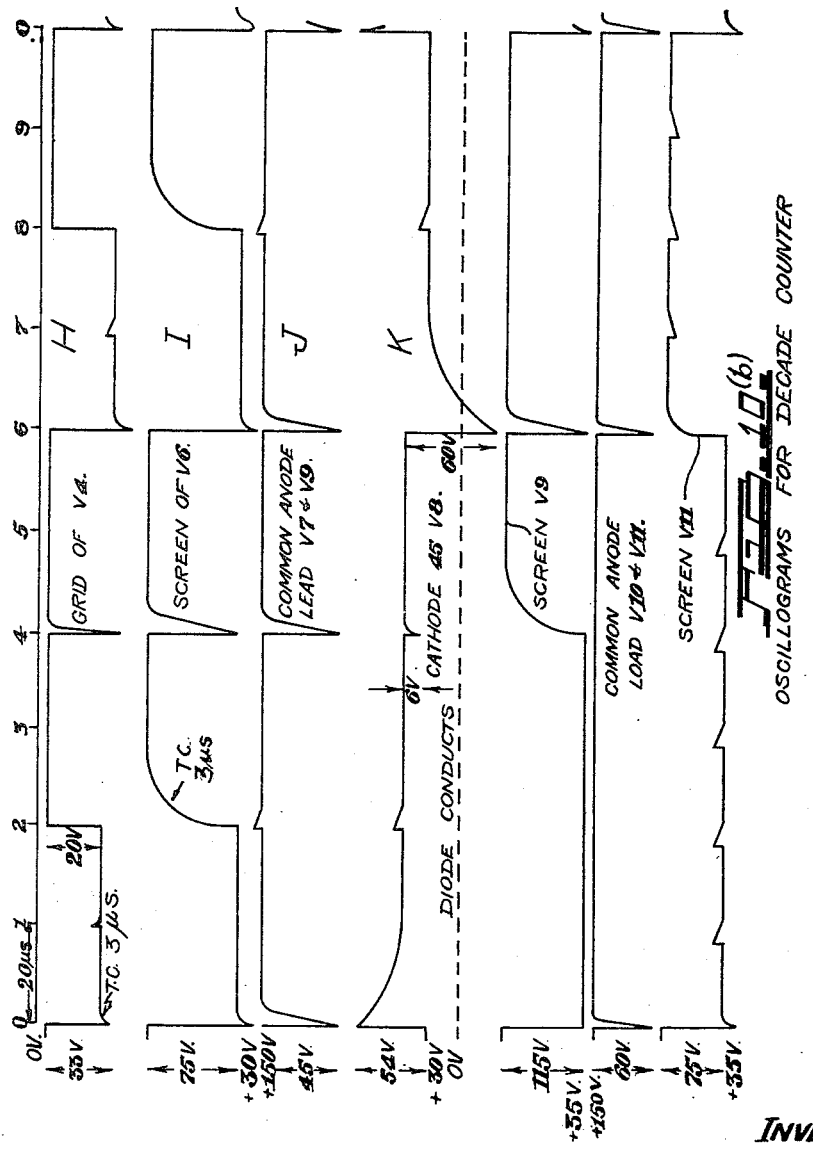

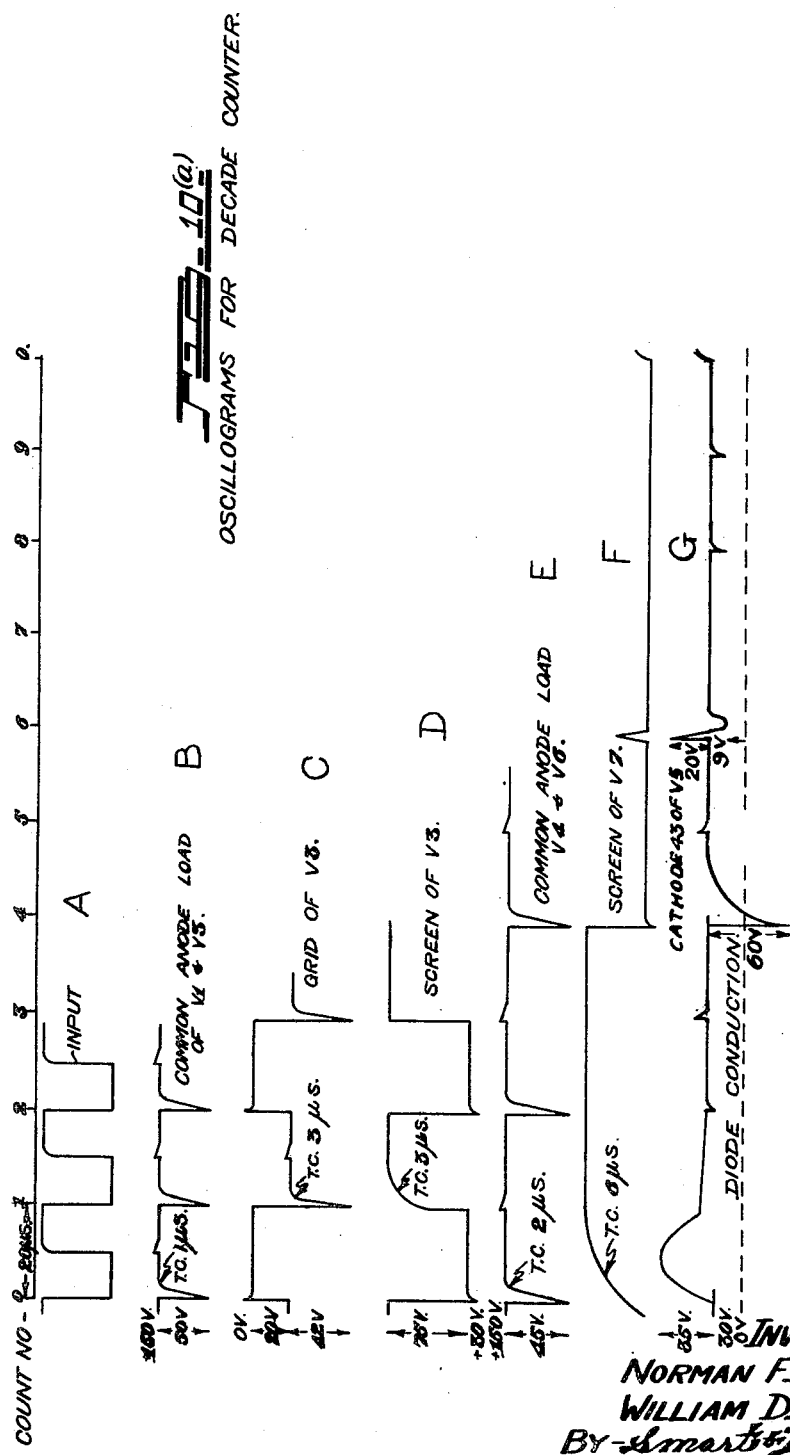

Patented Oct. 5, 1954

2,691,100

UNITED STATES PATENT OFFICE 2,691,100

ELECTRONIC COUNTER

Norman F. Moody and William D. Howell, Deep River, Ontario, Canada, assignors to National Research Council, Ottawa, Ontario, Canada, a body corporate of Canada Application July 24, 1950, Serial No. 175,514

Claims priority, application Canada August 4, 1949

2 Claims. (Cl. 250—27)

The invention relates to electronic counters of a type suitable for automatic counting of rapidly occurring events such as cosmic rays, radiations from radio active material or voltage transients in an electric circuit.

A commonly used electronic counter circuit is a series chain of binary switching circuits having trigger pulse feed back connections between certain of the switching circuits. Each binary switching circuit, sometimes called a multivibrator circuit or a flip-flop circuit, comprises a pair of triode or pentode tubes having an interconnection between the anode to cathode circuit of each tube and the control grid circuit of the other tube so arranged that conduction through one of the tubes will stop conduction in the other tube. The anode potentials of each tube change from a low value during periods of conduction to a high value during periods of non-conduction, and the circuit is so arranged that an input voltage pulse applied to the interconnections in parallel, causes the state of conduction of each tube of the pair to be changed. Each switch from a state of conduction to a state of non-conduction in each tube produces a sudden rise of anode potential of that tube, and each switch from the state of non-conduction to the state of conduction produces a sudden fall of anode potential. The rise and fall in anode potential form the edges of a square wave voltage pulse and, if only the square wave voltage pulses produced by one of the tubes of the pair are applied to the input of the next switching circuit, the result is a single input pulse to the next switching circuit for each two input pulses to the 1st switching circuit.

The natural counting scale of a series chain of four binary switching circuits is sixteen since, for each sixteen pulses applied to the input of the 1st switching circuit, only one pulse is produced in the output circuit of the 4th switching circuit due to each of the switching circuits having the effect of dividing by two the number of pulses received by it. For each sixteen input pulses fed to the 1st binary switching circuit, 8 pulses are fed to the 2nd binary switching circuit which in turn divides by two producing four pulses in the input of the 3rd binary switching circuit. The 3rd binary switching circuit divides by two producing two pulses in the input of the 4th binary switching circuit which produces the single output pulse of the chain.

For most applications it is much more convenient to have a counting scale of ten (decade scale) as required by the decimal system instead of the natural counting scale of sixteen, and usually the series chain of four switching circuits is modified to obtain an artificial scale of ten by having trigger pulse feed back connections between certain of the switching circuits. An artificial scale of ten may be obtained by having trigger pulse feed back connections between the 3rd and 2nd switching circuits and between the 4th and 3rd switching circuits. Each time the 2nd switching circuit produces a pulse at the input of the 3rd switching circuit (the first four pulses of the decade scale having been applied to the 1st switching circuit), the 3rd switching circuit feeds back a trigger pulse to the 2nd switching circuit causing the 2nd switching circuit to be immediately reset so that the state of conduction of the tubes in the 2nd switching circuit is the same as that corresponding to six pulses having been applied to the 1st switching circuit of the chain although actually only four pulses had been applied. Similarly, upon the third switching circuit transmitting a pulse to the fourth switching circuit, the fourth switching circuit feeds back a trigger pulse to the third switching circuit causing the third switching circuit to be immediately reset so that the state of conduction of the tubes in the third switching circuit is the same as that corresponding to twelve pulses having been applied to the first switching circuit of the chain although actually only six pulses had been applied. The next four pulses applied to the first switching circuit of the chain cause the first switching circuit to apply two pulses to the second switching circuit which, in turn, divides by two applying a single pulse to the third switching circuit. The third switching circuit then applies a second pulse to the fourth switching circuit causing it to supply a single pulse in the output of the chain.

Continuous indication of the progression of the count in a chain of switching circuits can be obtained by combining voltages obtained from the anode potentials of the tubes in the switching circuits. As explained above, the anode potential of each tube in the chain is either high or low depending on how many pulses have been applied to the input of the chain and with the anode potentials as voltage sources a unique lamp of a series of cold cathode gaseous discharge lamps can be lit during each count of the scale. By placing several decade count chains of binary switching circuits in series, a counter may be formed capable of counting to a high number. The first chain of the series would count units, the second hundreds, the third thousands, etc. For example, five decade count chains in series could register a maximum count of 99,999.

Prior to the invention, electronic counters have not been sufficiently reliable for some applications, such as the counting of radiations from radio active material when safety depended on the accuracy of the count. There have been several reasons for the lack of reliability, and one of the most important of these is the variation in tube parameters with ageing. Since indication is provided by discharge lamps having rather close striking and extinguishing voltages, for example, a striking voltage of 75 volts and an extinguishing voltage of 55 volts, it is important that the anode potentials of the tubes in the switching circuits during their state of conduction and non-conduction be at uniform levels. In counters, according to the prior art, it often happened that the low level of the anode potentials of the tubes in the switching circuits would vary by as much as 25 or more volts as a result of tube ageing which is accompanied by loss of emission. This change in the anode potentials affected the voltages applied to the discharge lamps so that often a lamp which should be extinguished would strike, or vice versa, giving an inaccurate count.

Another source of lack of reliability in previously known electronic counters, was the number of ways in which voltages obtained from the anode potentials of the tubes in the switching circuits could be combined to produce the striking and extinguishing voltages for the discharge lamps. In a decade chain, the common practice is to group the ten lamps into two groups of five, one electrode of each lamp in each group being connected together and the common connection of the electrodes in each group being connected to the anode circuits of the first switching circuit in the chain so that one group was supplied with a voltage on even number counts and the other group was supplied with a similar voltage on odd number counts. Certain common connections were made between the other electrodes of the lamps and these common connections were connected to appropriate anode circuits in the 2nd, 3rd and 4th switching circuits with the result that during a counting cycle there were a great many combinations by which the striking and extinguishing voltage could be obtained.

Still another source of unreliability was the feed-back circuits used between the switching circuits for reducing the natural scale count of sixteen to an artificial scale count of ten. The feed-back circuits should be disconnected from the pairs which they retrip at all times except when actual retrip occurs. It will be evident that if this is not so the elements associated with the feed-back circuit impose a load on the grid of a tube of the previous pair and so reduce reliability.

In the circuits of previously known electronic counters, the input pulses to each switching circuit were fed through a shaping circuit to the interconnections between the anode to cathode circuits of one tube and the control grid circuit of the other tube. A shaping circuit according to the prior art consisted of a resistor-capacitor network in which the capacitor was series connected from the source of square wave pulses to the interconnections between the tubes of a switching circuit, and the resistor was series connected from the source of anode voltage to the interconnections. The resistor - capacitor network shaped each square wave pulse into a sharp positive pulse corresponding to the rising edge of the square wave pulse and a sharp negative pulse corresponding to the falling edge of the square wave pulse. Whichever tube of the switching circuit happened to be conducting at the time the sharp positive pulse occurred, would adsorb the positive pulse and the sharp negative pulse would then cause the states of conduction of the tubes to be switched. However, often it was possible for the positive pulse itself to be differentiated in the networks of the binary pair to which it was applied. If so, the falling edge of the positive pulse produced a negative pulse which was only too likely to trip the switching circuit erroneously. A further disadvantage of such a system was that the anode current for the tubes passed through the resistor of the shaping circuit and the voltage drop which resulted made it necessary to use a source of higher anode voltage than would otherwise be required.

An electronic counter according to the invention overcomes the disadvantages of the prior art and is both reliable and accurate in its operation. According to the invention, the tubes in the switching circuits are operated in a bottomed condition resulting in very accurate determination of the low level of anode potential, during the periods of conduction of the tubes. In this specification, and in the attached claims, a tube is said to be "bottomed" when its load line intersects the line of coalescence of the characteristic anode current vs. anode potential curves of the tube. In the case of a bottomed tube, the anode potential ceases to fall as soon as the control grid becomes less negative than the point of intersection of the load line and the coalescent characteristic curves. Since the coalescent portions of the characteristic curves are almost parallel to the anode current ordinate, a fall in the emission in the tube due to ageing will cause only a very slight rise in the level of the anode potential when the tube is in a conducting state. In addition, the low level of anode potential depends on the highly stable properties of the tube in the case of a bottomed tube and so the low level is not affected by any variation which might occur in the supply lines, resistance tolerances and tube tolerances.

According to the invention, the indicator lamps are grouped into even number indicator lamps and odd number indicator lamps by common connections to the 1st switching circuit in a manner similar to the prior art practices except that each connection to the 1st switching circuit is through a rectifier. Use of rectifiers, which transmit a voltage of a given polarity only, reduces the number of possible combinations of voltages which might occur and cause improper operation of the indicator lamps.

In an electronic counter, according to the invention, feed back from one switching circuit to another, is through a rectifier. A second rectifier is used to limit the bias of the non-conducting tube of the switching circuit to which a pulse is fed back so that the tube is able quickly to switch from its non-conducting to a conducting state. Use of the second rectifier shortens the length of time required for switching in the switching circuit to such an extent that there is no danger of the next switching circuit being triggered at the same time, and also shortens the minimum time interval which must separate two pulses so that they can be counted independently (i. e. improves the resolving time).

In a shaping circuit according to the invention, an inductance and a rectifier are placed in shunt with the resistor which is series connected between the source of anode voltage and the interconnections of the tubes in the switching circuit with the result that the low direct current resistance of the inductance substantially eliminates the drop in voltage due to the shaping circuit and, consequently, a lower source of anode voltage can be used. However, the inductance presents a high impedance to the square wave pulses and so does not affect the operation of the circuit in respect to pulses. The rectifier is connected so that it eliminates the pulses corresponding to one of the edges of each input square wave pulse. Use of the shunt inductance prevents the rectifier from being biased by the voltage drop that would otherwise form across the resistor.

The invention will be further described by reference to the attached drawings which illustrate certain embodiments of it, and in which Figures 1(a) and 1(b), (subsequently referred to as Figure 1) together form a schematic diagram of an electronic counter according to the invention.

Figure 2 is a block diagram corresponding to Figure 1,

Figure 3 is a simplified schematic diagram of part of Figure 1 showing a binary switching circuit, according to the invention, Figure 4 shows oscillograms for the binary switching circuit shown in Figure 3, Figure 5 is a chart comparing natural count to decade count with indication of conduction or non-conduction in the switching circuit tubes shown in Figure 1, Figure 6 is a graph of the operating characteristics of a tube as used in a binary switching circuit according to the invention.

Figure 7:
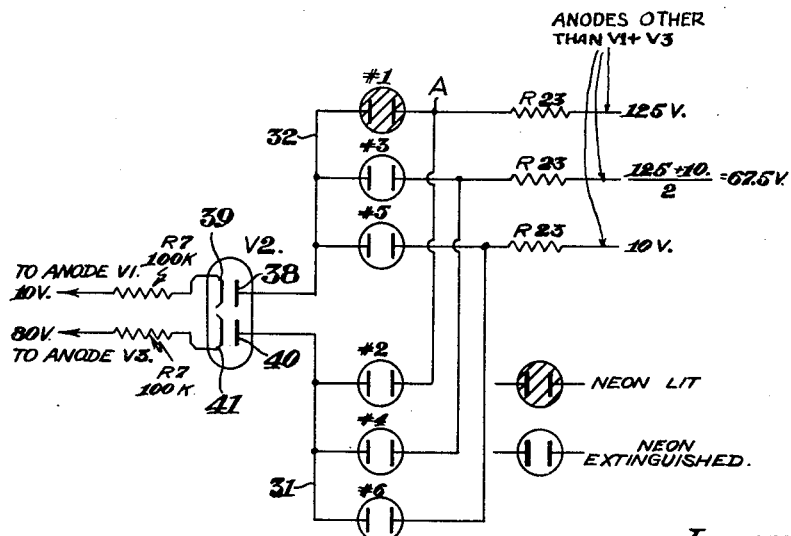

Figure 7 is a simplified schematic diagram of part of the neon lamp circuit of Figure 1, Figure 8 is a simplified schematic diagram of the circuit for neon lamps No. 0 and No. 1, Figure 9 is a chart showing the cyclic conditions of neon lamps No. 0 and Figures 10(a) and 10(b), (subsequently referred to as Figure 10) together show oscillograms for the schematic diagram shown in Figure 1.

A schematic circuit diagram for a series chain of binary switching circuits having gaseous discharge indicator lamps is shown in Figure 1 of the drawings. As shown in Figure 1, and in block form in Figure 2, the series chain comprises four binary switching circuits, the 1st having tubes V1 and V3, the 2nd V4 and V, the 3rd V7 and V9 and the 4th V10 and V11. Some of the parts in each switching circuit fulfill similar purposes and are identical in electrical characteristics, and in the following description of the circuit, the same designation will be used for such a part each time it appears in the circuit. The values of the resistors and capacitors used in the circuit are indicated in Figure 1 and, where it is necessary by way of explanation, they will be referred to in the following description. However, the electrical values and ratings of the components used are matters of design and can be readily calculated by those skilled in the art.

In each switching circuit there are interconnections 20, each inter-connection 20 being from the anode 21 of one tube through a resistor and a capacitor in shunt to the control grid 22 of the other tube. In the 1st switching circuit the resistor is designated as R1 having a value of 100,000 ohms (100K) and in the 2nd, 3rd and 4th switching circuits the resistor is designated R21 (330K). The capacitor in shunt to the resistor R1 and the capacitor in shunt with the resistor R21 in the 2nd switching circuit is designated as C1 having a value of 30 μμf. and in the 3rd and 4th switching circuits the capacitor in shunt with the resistor R21 is designated as C2 having a value of 50 μμf. The anodes 21 of the tubes V1 and V3 are connected to the input connection 23 for the 1st switching circuit by a resistor R2 (20K) and the anodes 21 of the tubes in the other switching circuits are each connected to its respective input connection 23 by a resistor R22 (33K). The input connection 23 for the 1st switching circuit has a series capacitor C3 (100 μμf.) and in the case of the 2nd, 3rd and 4th switching circuits, the series capacity in each of the input connections 23 is C4 (200 μμf.) In the case of the 3rd switching circuit, there is a resistor R20 (390K) from each of the anodes 21 of the tubes V7 and V9 to ground. The input connections 23 to the 1st switching circuit is connected to a +100 volt supply connection 24 by a resistor R3 (10K) in shunt with an inductance L1 and a rectifier X1 which may be, for example, a crystal or diode rectifier. The input connections 23 to the 2nd, 3rd and 4th switching circuits are each connected by a resistor R3, an inductance L1 and a rectifier X1 to a +150 volt supply connection 25 in the same manner as the input connection 23 of the 1st switching circuit is connected to the +100 volt connection 24.

The voltage supply for the screen grids 26 of each of the tubes in the 1st, 2nd and 4th is from the +100 volt connection 24 through a resistor R4 (18K), and the voltage supply for the screen grids 26 of each of the tubes in the 3rd switching circuit is from the +150 volt connection 25 through a resistor R5 (27K). There is a capacitor C5 (200 μμf.) connected between the screen grid 26 of each of the tubes V1, V4, V7 and V10 and a common ground connection 27. Control grid bias to each of the tubes in the switching circuits is supplied from a —100 volt supply connection 28 through a resistor, R6 (200K) in the case of the 1st switching circuit and R23 (390K) in the case of the 2nd, 3rd and 4th switching circuits. The resistor R6 for the tube V3 and the resistor R23 for each of the tubes, V6, V9 and V11 connect to a —100 volt reset connection 29 which is connected to the connection 28 through a push-to-break switch 30.

As shown in Figure 1, there is a cold cathode gaseous discharge lamp for each count of the decade scale, and each lamp is designated by the count number which it indicates. A common connection 31 connects together one electrode of each of the lamps which indicate an even number, No. 0, No. 2, No. 4, No. 6 and No. 8, and a common connection 32 connects together one electrode of each of the lamps which indicate an odd number, No. 1, No. 3, No. 5, No. 7 and No. 9. The remaining electrodes of the lamps are connected together in pairs by a common connection 33 between No. 0 and No. 1 lamps, a common connection 34 between No. 2 and No. 3 lamps, a common connection 35 between No. 4 and No. 5 lamps, a common connection 36 between No. 6 and No. 7 lamps and a common connection 37 between No. 8 and No. 9 lamps. The common connection 32 between the odd number lamps is connected to an anode 38 of a double diode rectifier tube V2 and the cathode 39 corresponding to the anode 38 is connected through a resistor R7

(100K) to the anode 21 of the tube V1. The common connection 31 between the even number lamps is connected to an anode 40 of the double diode V2 and the cathode 41 corresponding to the anode 40 is connected through a resistor R7 (100K) to the anode 21 of the tube V3. The filament 42 of the tube V2 has one side connected to ground through a resistor R8 (220K) and connected to the +100 volt connection 24 through a resistor R9 (220K). A capacitor C6 (.05 μfd.) is in shunt with the resistor R8.

The connection 33 between No. 0 and No. 1 lamps is connected by a resistor R10 (200K) to the anode 21 of the tube V4 and through a resistor R10 to the common connection 36 of the lamps No. 6 and No. 7. Another resistor R10 from the common connection 33 connects to the anode 21 of the tube V10, and through a resistor R10, to the common connection 35 of the lamps No. 4 and No. 5. A resistor R10 connects the common connection 34 of the lamps No. 2 and No. 3 to the anode 21 of the tube V6 and, through a resistor R10 to the common connection 37 of lamps No. 8 and No. 9. Another resistor R10 from the common connection 34 connects to the anode 21 of the tube V7. The common connections 35 of lamps No. 4 and No. 5, and 37 of lamps No. 8 and No. 9, each connect through a resistor R10 to the anode 21 of each of the tubes V9, and V11, respectively. The common connection 36 of lamps No. 6 and No. 7 connects through a resistor R10 to the anode 21 of V11.

The feedback connection between the 3rd and 2nd switching circuits is through a series capacitor V7 (100 μμf.) between the screen grid 26 of the tube V7 and a cathode 43 of a double diode rectifier tube V5. The anode 44 corresponding to the cathode 43 is connected to the control grid 22 of the tube V6 and through a resistor R11 (270K) to the ground connection 27. The control grid 22 of the tube V4 is also connected to the ground connection 27 through a resistor R11. The feedback connection between the 4th and 3rd switching circuits is through a series capacitor C3 (150 μμf.) between the screen grid 26 of the tube V10 and a cathode 45 of a double diode rectifier tube V8. The anode 46 corresponding to the cathode 45 is connected to the control grid 22 of the tube V9. Positive bias is supplied to the cathodes 43 and 45 by a voltage divider comprising the resistors R12 (120K) and R13 (30K) between the +150 volt connection 25 and the ground connection 27. The connection between the resistors R12 and R13 is bypassed to the ground connection 27 through a capacitor C9 (.05 μfd.) and is connected by a connection 47 to a common connection between resistors R14 (100K) and R15 (50K) which are in series between the cathode 45 of the tube V8 and the cathode 43 of the tube V5.

The control grid 22 of the tube V4 has a bias connection by the cathode 48 and its corresponding anode 49 of the tube V5 to the common connection between a pair of voltage dividing resistors R16 (850 ohms) and R17 (1.7K) between the ground connection 27 and the —100 volt connection 28. A bypass capacitor C10 (.01 μfd.) is connected from the common connection of the resistors R16 and R17 to the ground connection 27. The anode 49 is connected to the anode 50 of the tube V8 and the cathode 51 corresponding to the anode 50 connects to the control grid 22 of the tube V7.

The +100 volt connection 24, the +150 volt connection 25, the ground connection 27 and the —100 volt connection 28 are supplied with their respective voltages from any suitable, well regulated supply of D. C. voltage. As shown in Figure 1, there is a bypass capacitor C11 (.1 μfd.) from the +100 volt connection 24 to ground, and a resistor R18 (4.2K) between the +100 volt connection 24 and the +150 volt connection 25. The —100 volt connection 28 is bypassed to the ground connection 27 through a capacitor C12 (.01 μfd.).

The operation of a binary switching circuit is characterized by the fact that it has only two stable states: either one tube will conduct and the other will be cut off or vice versa. In the simplified circuit for the 4th switching circuit shown in Figure 3, transition from one state to the other occurs when a negative voltage pulse is applied to the input connection through the capacitor C4. If the switch 30 is opened, the negative bias from the —100 volt connection 28 will be removed from the tube V11 which must therefore conduct, so that the tube V10 will be cut off by the negative bias applied to its control grid 22 via the resistors R21 and R23. This state will be maintained when the switch 30 is reclosed, and will be the starting point for the explanation of the operation of the circuit.

With V10 cut off the anode 21 of V10 will rise in potential to about 125 volts, the difference of 25 volts between that value and the 150 volt potential of the +150 volt connection 25 being caused by the loads R21 and the indicating lamp circuits (not shown in Figure 3). The tube V11 will draw control grid current whose value is given by $$i = \frac{125V}{R21} - \frac{100V}{R23} = \frac{125}{330K} - \frac{100}{390K} = 0.12 \text{ ma.}$$

and so the control grid potential of V11 is substantially at earth.

The curves shown in Figure 6 indicate the condition in the tube V11 (with the screen grid 26 at +30 volts when the control grid 22 is at 0 volts) such that the intersection of the load line for R22 (33K) gives a value of $E_A$ (anode potential) of 10–15 volts. Since the load line intersects the curve below the knee of the pentode characteristic curve, the condition is known as "bottoming," and the low level of the anode potential is very accurately set in a manner which is reasonable independent of variations in tube parameters for a given tube. In this connection it is seen that even a negative bias of —1.5 volts applied to the grid will raise the anode potential only by about 10 volts which will not disturb the operation, and corresponds to the reduction of cathode current which may be expected with a tube during its life.

The condition of bottoming occurs if the cathode current is set to a value which is about twice the anode current instead of the usual 1.1 to 1.3 associated with pentodes. For a fixed anode load, the anode current cannot exceed the intersection of the load line with the ordinate (Figure 6), so that the surplus cathode current must flow to the screen. By correct choice of screen voltage any desired cathode current can be set up at a particular grid bias, in this case zero bias. However, the screen voltage required may vary from tube to tube, but should the screen be fed via a resistor from a source voltage large compared to that required to supply screen potential, this resistor will itself control the screen current and the cathode current itself will be largely independent of the tube characteristics. For the circuit in Figure 3, the potential of the screen grid 26 of V11 is 30 volts obtained from the +100 volt connection via R4. Should the tube age, as mentioned above, the screen current will fall far more than the anode current, (for the example quoted, —1.5 volts reduced the anode current by about 0.6 ma. but the cathode current was reduced by 3 ma.), and it follows that the screen grid potential will rise so as largely to compensate for the loss of cathode emission. Thus screen voltage rather than anode voltage is a measure of tube ageing, and the method of operation employed gives exceptionally long life since tubes must deteriorate far before they fail.

The operation of the circuit when pulses are received will now be described. Imagine an input square wave with steep edges and 75 volt ampitude applied to C4 in Figure 3, then the square wave will appear on the connection 23 in differentiated form. The waveforms of this discussion are shown in Figure 4 where A and B are the input and differentiated waves. When the square wave has a positive edge C4 will be charged by the rectifier X1 without producing any significant voltage on the connection 23, but on the negative edge of the voltage on connection 23 will fail and C4 will be recharged through R3 giving a time constant of recovery of 2 microseconds. Inductance L1 plays no part in this action since its inductance is relatively great. Inductance L1 serves to pass the anode currents of V10 and V11 without causing the rectifier to be permanently biased, as would happen were it omitted.

A 50-volt negative pulse appears on connection 23, 25 volts being lost in the shaping process, and this wave finds its way to the anodes 21 via the resistors R22. Assuming V11 to be conducting, depressing connection 23 by 50-volt pulse temporarily reduce its anode current. However, since the tube is bottomed, the change of current will not influence its potential significantly, so that the effect of the pulse at this point may be ignored. With V10, however, it is another matter. Since the valve is cut off, the anode voltage will fall as the potential of the connection 23 is depressed, and by a somewhat smaller amount. This fall will be transmitted to the control grid 22 of V11 via C2 thus cutting off anode current in V11.

Current will be stopped in V11 in about 0.1–0.2 microsecond after the instant of triggering and the anode will commence to rise after this delay time. It must rise about 40 volts to overcome the bias on the control grid 22 of V10, the rise being transferred with little loss via C2, and this may be expected to occupy another 0.2 microsecond.

In 0.3 to 0.4 microsecond, that is within the trigger pulse duration (2 microseconds), the changeover of current has taken place. Thereafter as the control grid 22 of V10 is switched on, its anode falls rapidly, so that the control grid 22 of V11 is taken to about —90 volts, from which is slowly recovers (time constant 10 microseconds) to its quiescent value of —40 volts and control grid current flows in V10.

The rising anode voltage of V11 completes the first 40–50 volts of its excursion charging stray capacities only: once control grid current flows in V10, C2 must be charged and the recovery is completed with a time constant of about 2 microseconds. In this connection it should be noted that the voltage of the connection 23 was depressed 50 volts by the pulse so that an alternative limit is set to the rise of the anode potential of V11 by the decay of the trigger pulse.

A second pulse arriving will retrip the pair in the opposite direction. It may be wondered why subsequent pulses reverse the state of conduction since the circuit is symmetrical. This results particularly from the storage of charges in the capacitors C2 corresponding to the differing control grid potential before the pulse is applied. This charge is not greatly altered during the trip action on either capacitor, and is maintained or remembered for 10 microseconds after tripping at the grid which is being driven negatively (V11 in above description—see also waveform E, Figure 4). The capacitors C2 therefore constitute a "memory," which control the system during the trigger pulse, and is maintained for a few microseconds thereafter. During the recovery or storage of the new charge condition the circuit will refuse to retrip or will need a larger pulse to cause the transition.

Due to these effects one might expect the resolving time of the last pair to be about 10 microseconds, and this is roughly true. Subsidiary features of note exist. When anode current in either tube is cut off, the screen voltage rises to 100 volts and evidently the cathode current of that valve is then potentially high. When this tube is switched on, the cathode current is therefore several times its final value for the microsecond or so needed to discharge the screen capacities. This explains the rapid fall of the anode voltage of V10 as shown in Figure 4 by curve C and mentioned above. During this fall the anode will bottom rapidly, and once in this condition, the anode current is limited to 4 ma. so that perhaps 10 ma. is available to the screen grid.

A screen grid is used to generate the square waves for triggering subsequent pairs, and the initial rapid fall is very necessary to perform this function satisfactorily. In the pair described, capacity is not shown on the screen grid of V11, but it is contributed by the shaping circuit of the first switching circuit of the next decade (C3, R3, L1 and X1). Whilst the screen potential is rising, C3 will charge via X1, but on the negative edge where the next pair is to trigger, only the stray capacities need charging so that a fast negative edge is given.

The third switching circuit which includes V7 and V9 does not differ in principle from the 4th switching circuit described above, but includes in its circuit the double diode V8 and has the value of its screen resistors raised from 18K to 27K with connection to the +150-volt connection 25 instead of the +100-volt connection 24. These changes are associated with the mechanism for producing the decade count and will be discussed later in connection with its operation.

The only basic differences between the circuit of the 2nd switching circuit and that of the 4th switching circuit is that in the 2nd there is a double diode V5 used for the reasons described above in connection with double diode V8, as well as a reduction in control grid time constant due to the coupling capacitors C1 being 30 $\mu\mu f.$ and the additional shunt resistors R11 (270K), connected from the control grid 22 to ground. These changes reduce the control grid time constants from 10 microseconds to about 4 microseconds, and limit the grid excursion in a negative direction. The former is the more significant factor in reducing resolving time, but the reduction of grid bias on the cut-off tube does facilitate retriggering before full recovery of the grid memory circuit and thus provides a safety factor in the reliability of operation.

The resolving time of the 1st switching circuit is a limiting factor for the resolving time of the complete series chain of the four switching circuits. For a 2.5 microseconds resolving time in the 1st switching circuit, the 2nd switching circuit may have a resolving time of 5 microseconds so that it is the 1st switching circuit which presents the greater difficulties.

Limits to the resolving time are set by:

(i) The triggering pulse duration—evidently 2 microseconds exponents will not allow the pair to settle down between pulses.
(ii) The grid time constant. This may exceed the resolving time but a significant fraction of "memory" must be lost between pulses.
(iii) The anode time constants. The anodes must come nearly to rest before retriggering can be performed.

To a limited extent a heavy drive pulse or increased triggering sensitivity is helpful in reducing resolving time, but no more than 50% can be gained by this means, and such practice should be used only to give additional safety.

Considering these requirements in turn the 1st switching circuit is modified by comparison with the 4th switching circuit as follows:

(i) Trigger pulse reduced to 1 microsecond ($C3=100$ $\mu\mu f$).
(ii) Grid time constant 2 microseconds approximately ($C1=30$ $\mu\mu f$., coupling resistors $R1$ and $R6=100K$ and $200K$ respectively).
(iii) Anode time constant reduced to about 0.6–0.8 microsecond by use of 30 $\mu\mu f$. coupling condensers and 20K anode loads $R2$.

To allow for the reduced anode loads without excessive anode current, the anode supply is taken from the $+100$ volt connection 24 instead of the $+150$ volt connection 25 as in all other switching circuits.

It is a great aid in counting operations to have a decimal system of scales. The benefit is further increased, and correct operation is more readily checked, if each of the ten counts is indicated by a single neon so that no addition is required in interpolation. The 1st switching circuit divides by two and, if the decimal system is to be followed, the remaining switching circuits (a natural scale of 8) must divide by 5. Since the 1st switching circuit will deliver pulses to the divide by 5 sections only for each alternate input pulse, the divide by 5 section may be considered independently as receiving pulses at 2, 4, 6, 8, and 10 counts respectively, and it will be necessary only to consider these pulses to explain its operation. The chart shown in Figure 5 gives a comparison between the configurations of the states of conduction in the tubes of the switching circuits for each count in both the natural and artificial scales. As shown in Figure 5, with the counter set to zero by the reset button, the right hand tubes V3, V6, V9 and V11 will all be conducting. On the second pulse V6 in the 2nd switching circuit will cut off, but this will not influence the 3rd switching circuit, since the positive edge at its screen is absorbed by X1 after passing C4. The arrival of a fourth pulse will render the tube V6 conducting again, and since its screen grid falls, the 3rd switching circuit will switch so that the tube V7 conducts. Anode configurations are shown up to this stage in Figure 5, decade count, where the last state is shown as count No. 4A. So far the operation has not differed from that of a series chain of switching circuits without feedback.

However, state 4A is maintained for only a fraction of a microsecond. As the screen grid of the tube V7 falls a negative impulse is applied via C7 and the right hand portion of the double diode tube V5 to the control grid of the tube V6. The latter tube was conducting as a result of the fourth pulse, but is now cut off so that the 2nd switching circuit switches again, automatically. The effect, therefore, is that the 2nd switching circuit merely transmits a triggering pulse to the 3rd switching circuit while the final state of the 2nd switching circuit is undisturbed and the arrangement of conduction is now as shown at count 4, decade count, of Figure 5.

On the arrival of the 6th pulse the 2nd switching circuit switches again, the tube V6 conducts once more and results in a switch of the states of conduction in the 3rd switching circuit. The tube V9, which had been cut off, now draws current and its screen grid falls thus triggering the 4th switching circuit. This state, which is transitory, is shown in Figure 5, decade count, as 6A.

By similar mechanism the fall of the screen grid of the tube V10 applies a negative pulse via the capacitor C8 and the right hand side of double diode tube V8, so that after a fraction of a microsecond, the tube V9 cuts off and the 3rd switching circuit reverts to the original states of conduction in its tubes. The anode quiescent conditions are shown as count 6 of Figure 5, decade count. The effect is that the 3rd switching circuit has transmitted a pulse to the fourth switching circuit, but the final state of the 3rd switching circuit is undisturbed.

Since the 3rd switching circuit has been triggered twice in this action—once by pulse 6 and once by the feedback, it may be wondered why the 2nd switching circuit has not been disturbed by the feedback loop between the 3rd and 2nd switching circuits. This point will be discussed later, and at this stage it suffices to say that the 3rd switching circuit must remain with the tube V7 cut off for about 2 microseconds before the retrip circuit is primed, and the retrip action between the 3rd and 4th switching circuits is far shorter than this.

The remainder of the counting cycle is entirely normal as is seen by comparing the last four counts of the decade count with the last four counts of the natural count in Figure 5. The 3rd and 4th switching circuits are not tripped again so that the feedback plays no part in the remainder of the counting cycle. Since all the unusual actions take place between the counts 4A and 4 and between 6A and 6, further consideration will be given these counts in the following explanation of the feedback action.

Feedback pulses from the 3rd to the 2nd switching circuit are taken from the screen grid of the tube V7 and are applied via the double diode tube V5 to the control grid of the tube V6. The screen grid and diode cathode waveforms are shown in Figure 10, F and G respectively.

Referring to the screen grid waveform F, the significant features are that there is only one large negative edge at the count of 4, and that the screen rise at counts of 0 and 10 is governed mainly by a 6 microsecond time constant due to C5 and R5. The waveform F is differentiated by C7 and R15 (whose time constant is substantially the same as that of C5 and R5) so that the waveform appearing at the cathode 43 of the diode tube V5 is, as shown in Figure 10, G, in which the dotted line, the conduction level of the diode tube V5, conduction occurring at voltages negative to this level.

On the fourth pulse, the screen grid voltage of the tube V7 falls very sharply and substantially 85% of the fall (60 volts) appears at the diode tube V5 and 30 volts is transmitted by the diode tube V5 to the control grid of the tube V6 which, at that time, is conducting. The 2nd switching circuit quickly retrips, and this is facilitated by the fact that the tube V4 cannot be biased by more than 33 volts negative by virtue of the left hand portion of diode tube V5 being at 33 volts negative. Without the diode tube V5 this grid would be at about 90 volts negative since the switching circuit has just tripped, and resetting would be more unreliable. On the 6th pulse, as explained above, the 3rd switching circuit is tripped and rapidly reset by a feedback pulse. This action probably takes around 1 microsecond, so that the screen grid of the tube V7 rises in voltage by only a small fraction of its complete excursion due to the 6 microseconds time constant. Furthermore the differing time constant of C7 and R15 (5 microseconds) does not differentiate appreciably and is so short a time that there is negligible swing in a negative direction (see the 3rd waveform of Figure 10, G). The small negative swing is far below the threshold value needed to overcome the bias of the section of the diode tube V5 in series with the feedback circuit.

Turning now to the feedback circuit between the 3rd and 4th switching circuits, the voltage of the screen grid of the tube V10 rises on the 10th pulse (also denoted 0) and falls on the 6th pulse. After differentiation by the network C8 and R14 (10 microseconds time constant) the waveforms are as shown in Figure 10, K, and resetting of the 3rd switching circuit occurrs in a manner similar to that described above in connection with resetting of the 2nd switching circuit. A complete set of waveforms for all the switching circuits is given in Figure 10 and these are self explanatory.

In the indicating lamp circuit, as shown in Figure 1, the neon lamps are grouped into an "odd" and an "even" bank and the common connection 32 from those in the odd bank is made via the diode tube V2 to the anode 21 of the tube V1 and the even bank is similarly connected to the anode 21 of the tube V3 by the common connection 31. The free connection of each neon then connects via two resistors R10, to two anodes other than those in the 1st switching circuit. The cathodes 39 and 41 of the diodes feeding the odd-even lines 32 and 31, can have either of two potentials: 10 volts or 80 volts. The free side of each neon lamp can take up the mean potential of the two anodes to which it is connected, and the anodes can be at 125 volts or 10 volts. Since both anodes can be at 125 volts, or one at 125 volts and one at 10 volts or both at 10 volts it is seen that three combinations of voltage are set in this way. Two further combinations are set by the odd-even selection of the first switching circuit making 6 combinations in all. Since no more than 6 combinations can occur, only 6 neon lamps need to be considered, and the voltage stresses applied to these calculated in order to ensure that one only will illuminate for a single count. A further simplification may be made by replacing the two resistors R10 with a single resistor R23 (Figure 7) of half the value having the mean of the two anode voltages impressed on it. Figure 7 shows the simplified circuit, and the stresses applied to the neon lamps cover all cases existing in the counter circuit of Figure 1. The numbering of the neon lamps in Figure 7 is not intended to agree with the numbering of the neon lamps in Figure 1, but is used to indicate odd and even lamps.

Nominal values of operating voltages for neon lamps will be taken as follows for purposes of explaining the circuit: striking voltage 75 volts, burning voltage 60 volts and extinguishing voltage 55 volts. If it be assumed that No. 1 neon lamp only can light, then the stress across it is (125—10) volts=115 volts and since this exceeds the striking voltage of 75 volts it will strike, and thereafter burn at 60 volts.

The current flowing is $$\frac{(115-60) \text{ volts}}{200K \text{ ohms}} = 275\mu a.$$

Evidently the No. 3 and No. 5 neon lamps are stressed by the potential at the anode 38 relative to that on the ends of the series resistors R23. This potential is 10+(100,000×275 μa.)=37.5 volts. Then the stress on No. 3 neon lamp is 67.5—37.5=30 volts and, since this is less than 55 volts (the extinction potential), the neon cannot be alight. Note that should the No. 1 neon lamp fail to light, the potential of the anode 38 would be 10 volts and the No. 3 neon lamp would be stressed to 57.5 volts and might strike. In this unlikely event a negligible current would flow so that No. 1 neon lamp would remain fully stressed, and when it strikes it would extinguish No. 3 neon lamp.

No. 5 neon lamp is stressed with (37.5—10 volts) =27.5 volts and so cannot light.

Turning now to the even numbered lamps, No. 2 lamp has the stress existing between the point A (Figure 7) and the 80 volt potential of the diode cathode 42. Since the point A is 27.5 volts below 125 volts (due to the 275 μa. drawn drawn by No. 1 neon lamp) the stress is (97.5—80) volts=15 volts so that it cannot light. If the No. 1 neon lamp were defective and failed to operate the stress on the No. 2 neon lamp would be higher, namely 45 volts, and should it strike at this voltage point A would be at (80+45) volts=125 volts so that No. 1 neon lamp has the full voltage applied to it and when it does strike, it will extinguish No. 2 neon lamp. No. 4 neon lamp cannot light by its direct path, since its 15 volt stress is in any case in the wrong direction for the diode V2 in the common line 31 to conduct.

No. 6 neon lamp would have 70 volts of stress by the direct path but the sense is wrong for conduction in the diode V2.

It will be noticed from Figure 7, that whilst the common even line 31 cannot exceed 80 volts it can fall below this value. Should it take an intermediate potential two neon lamps in series might strike. No. 2 and No. 6 neon lamps have their free ends taken to (125—10) volts=115 volts so that there is 57.5 volts across each neon lamp. Assuming No. 1 neon lamp has not struck, and that each neon burned at 45 volts there would be an excess voltage of (115—90)=25 volts appearing across each of the 100K resistors R23 in the series path. Thus the point A would fall 12.5 volts on the nominal 125 to 112.5 volts and 102.5 volts would be available to strike No. 1 neon lamp. No. 1 neon lamp will fire, and when it does so the stress on No. 2 and No. 4 neon lamps will reduce to 77.5 volts, and since these cannot burn with less than 90 volts applied (45 volts to each), they will be extinguished.

Thus, only one neon lamp—that selected by two "high" anodes in the 2nd, 3rd and 4th switching circuits and the "low" anode in the 1st switching circuit, can light for any of the combinations of high and low voltages which might be applied to the neon lamps.

What we claim as our invention is:

1. A binary switching circuit comprising two electronic vacuum tubes each having an anode, a cathode and a control grid, interconnections between the anode to cathode circuit of each tube and the control grid circuit of the other tube adapted to permit the anode potential of either tube to exceed a predetermined upper value when the anode potential of the other tube is restricted to less than a lower predetermined value, a source of anode voltage for said tubes, an input connection for a voltage pulse of predetermined sense and magnitude, the sense and magnitude of said pulse being so predetermined that said pulse causes the anode potential of the tube having an anode potential exceeding the predetermined upper value to be reduced to less than the predetermined lower value, a condenser series connected between the input connection and each of said interconnections, a resistor series connected between the source of anode voltage and each of said interconnections, an inductance in shunt with each said resistor, said inductance having relatively low direct current resistance but having in respect of said pulse a high impedance relative to that of said resistor, and a rectifier in shunt with said resistor and said inductance adapted to offer a high impedance relative to that of said resistor in respect to current due to the negative fall of said pulse.

2. A binary switching circuit according to claim 1 in which each tube has at least one electrode more than an anode, a cathode and a control grid and in which said circuit is adapted to provide operating conditions for the tubes such that either tube bottoms when its control grid voltage exceeds a predetermined value in a positive direction, and the lower value of the anode potential of either tube is determined by bottoming of that tube.

References Cited in the file of this patent

UNITED STATES PATENTS

| Number | Name | Date |
| --- | --- | --- |
| 2,306,386 | Hollywood | Dec. 29, 1942 |
| 2,416,158 | Coykendall | Feb. 18, 1947 |
| 2,436,963 | Grosdoff | Mar. 2, 1948 |
| 2,503,662 | Flowers | Apr. 11, 1950 |
| 2,513,442 | Baker | July 4, 1950 |
| 2,516,146 | Brugh | July 25, 1950 |
| 2,521,788 | Grosdoff | Sept. 12, 1950 |
| 2,540,442 | Grosdoff | Feb. 6, 1951 |
| 2,563,102 | Grossman et al. | Aug. 7, 1951 |
| 2,563,123 | Luck et al. | Aug. 7, 1951 |